(12) United States Patent
Kim et al.

(10) Patent No.: US 7,688,554 B2
(45) Date of Patent: Mar. 30, 2010

(54) DIGITAL MAGNETORESISTANCE SENSOR

(75) Inventors: Sung-dong Kim, Seongnam-si (KR);
Sung-ho Jin, San Diego, CA (US);
Hoon-sang Oh, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1049 days.

(21) Appl. No.: 11/376,237

(22) Filed: Mar. 16, 2006

(65) Prior Publication Data

US 2006/0209467 A1 Sep. 21, 2006

Related U.S. Application Data

(60) Provisional application No. 60/661,916, filed on Mar. 16, 2005.

(30) Foreign Application Priority Data

May 3, 2005 (KR) .................... 10-2005-0037046

(51) Int. Cl.
*G11B 5/33* (2006.01)
(52) U.S. Cl. ..................................... 360/313
(58) Field of Classification Search ............. None
See application file for complete search history.

(56) References Cited

U.S. PATENT DOCUMENTS 6,747,854 B1 *  6/2004   Ruigrok et al.   .......... 360/327.3

FOREIGN PATENT DOCUMENTS

| JP | 47-18814   | 5/1972 |
| JP | 62-016114 A | 1/1987 |
| JP | 62-202773 A | 9/1987 |

* cited by examiner

*Primary Examiner*—Mark Blouin
(74) *Attorney, Agent, or Firm*—Sughrue Mion, PLLC

(57) ABSTRACT

A digital MR sensor with a high magnetoresistance ratio is provided. The MR sensor includes a first magnetic element; and a second magnetic element at least a part of which is resiliently deformable so as to contact with or be separated from the first magnetic element according to a direction of a magnetic force generated between the first and second magnetic elements while the second magnetic element is magnetized under influence of an external magnetic field.

23 Claims, 4 Drawing Sheets

DIGITAL MAGNETORESISTANCE SENSOR

CROSS-REFERENCE TO RELATED PATENT APPLICATION

This application claims the benefit of U.S. Provisional Patent Application No. 60/661,916, filed on Mar. 16, 2005 and Korean Patent Application No. 10-2005-0037046, filed on May 3, 2005, in the Korean Intellectual Property Office, the disclosures of which are incorporated herein in their entirety by reference.

BACKGROUND OF THE INVENTION

1. Field of the Invention

Apparatuses and methods consistent with the present invention relate to a magneto-resistive (MR) sensor, and more particularly, to a MR sensor which detects a magnetic field using a change in electric resistance between two magnetic bodies that is caused by the change in an external magnetic field.

2. Description of the Related Art

Hard disk drives (HDD) are widely used as information storage devices and use magnetic material as an information recording medium. In a HDD, information is recorded by applying strong magnetic field to a local region, called a bit, of recording medium, thereby switching the magnetization direction of the region. Stored information is detected by using the magneto-resistive (MR) sensor which detects the direction and strength of the magnetic field coming out from the bit recorded on the medium. Since bit size gets smaller and smaller as recording density is increased, the magnetic signal from the recording medium also gets smaller. In order to realize high recording density, one of the critical issues is how to effectively detect the small magnetic field emanating from the small bits recorded on the medium. To enhance the detection capability of the MR sensor, various types of sensors adopting different mechanisms such as anisotropic magnetoresistance (AMR), giant magnetoresistance (GMR), and tunneling magnetoresistance (TMR) have been developed. The initial AMR type sensor has a 1~2% magnetoresistance ratio compared to the present GMR type sensor which has approximately a 10% magnetoresistance ratio, and currently, the TMR type sensor with approximately a 40% magnetoresistance ratio is being implemented for a read sensor for commercial magnetic heads for a HDD.

However, in order to accurately reproduce information from a magnetic recording medium having a recording density of several Tera bits per square inch ($Th/in^2$), a new magnetic sensor with a much higher magnetoresistance ratio than as described above may be required.

SUMMARY OF THE INVENTION

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above. An embodiment of the present invention provides a magnetic sensor with a high magnetoresistance ratio and a discontinuous change in resistance of approximately thousands of percent depending on the existence of an external magnetic field or on magnetic orientation.

According to an aspect of the present invention, there is provided a digital magneto-resistive (MR) sensor including a first magnetic element; and a second magnetic element at least a part of which is resiliently deformable so as to contact with or be separated from the first magnetic element according to a direction of a magnetic force generated between the first and second magnetic elements while the second magnetic element is magnetized under influence of an external magnetic field. The detection of resistance between the first and second magnetic elements may be conducted by a resistance detection unit of a conventional MR sensor.

The first magnetic element may have at least a part thereof composed of hard magnetic material, soft magnetic material, or semi-hard magnetic material, and the second magnetic element may have at least a part thereof composed of soft magnetic material or semi-hard magnetic material. As for the hard magnetic material, Alnico (an alloy containing Al, Ni and Co in Fe), a rare earth magnet or hard ferrite etc. may be used. As for the soft magnetic material, Fe—Si alloy, permalloy (Ni—Fe alloy), amorphous magnetic alloy such as Fe—Co—B, nano crystal alloy such as Fe—Ta—N or soft ferrite etc. which has a coercive force of 5 or less Oe may be used. In addition, instead of using a soft magnetic material, a semi-hard magnetic material may be also used which has a coercive force of about 5 to 50 Oe. The soft magnetic material and the semi-hard magnetic material may have magnetic hysteresis (MH) curves with square shape so as to react in local areas well defined with respect to the magnetic field emitted from the magnetic recording medium.

In view of shape and structure, at least one of the first and second magnetic elements may be integrally formed by using resiliently deformable material, and may have a structure in which a magnetic member and a resilient member connected therewith are combined with each other such that the resilient member changes a position of the magnetic member through the resilient deformation thereof.

According to another aspect of the present invention, there is provided a MR sensor including a first magnetic layer formed on a substrate; an insulating layer partially formed on the first magnetic layer; and a second magnetic layer having a portion contacting the upper surface of the insulating layer and the other portion extending beyond the insulating layer so that the extended portion faces a part of the first magnetic layer, wherein the second portion of the second magnetic layer is resiliently deformable so as to contact with or be separated from the first magnetic layer according to a direction of a magnetic force generated between the first and second magnetic layers while the second magnetic layer is magnetized under influence of an external magnetic field.

According to still another aspect of the present invention, there is provided a MR sensor including a first carbon nano tube resilient member fixed at its first end to a substrate; a first magnetic member provided at a free end of the first carbon nano tube resilient member; a second carbon nano tube resilient member provided adjacent to the first carbon nano tube resilient member and fixed at its first end to the substrate; and a second magnetic member provided at a free end of the second carbon nano tube resilient member which is resiliently deformable, so as to contact with or be separated from the first magnetic member according to a direction of a magnetic force generated between the first and second magnetic members while the second magnetic member is magnetized under influence of an external magnetic field.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EXEMPLARY EMBODIMENTS OF THE INVENTION

Embodiments of a digital MR sensor according to the present invention will now be described more fully hereinafter with reference to the accompanying drawings. The features and advantages of the present invention will be more clearly understood from the description of the embodiments. The same numbers refer to the same elements throughout the drawings.

Figure 1:
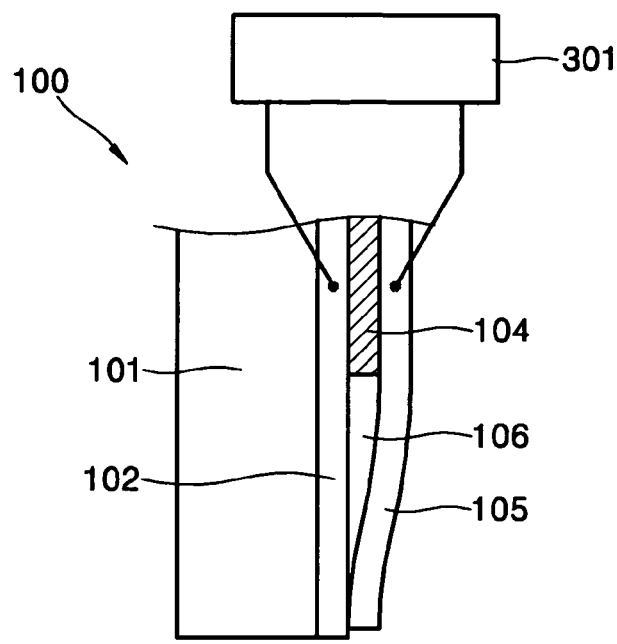
FIGS. 1 and 2 are schematic views illustrating a MR sensor according to a first embodiment of the present invention.
Figure 2:
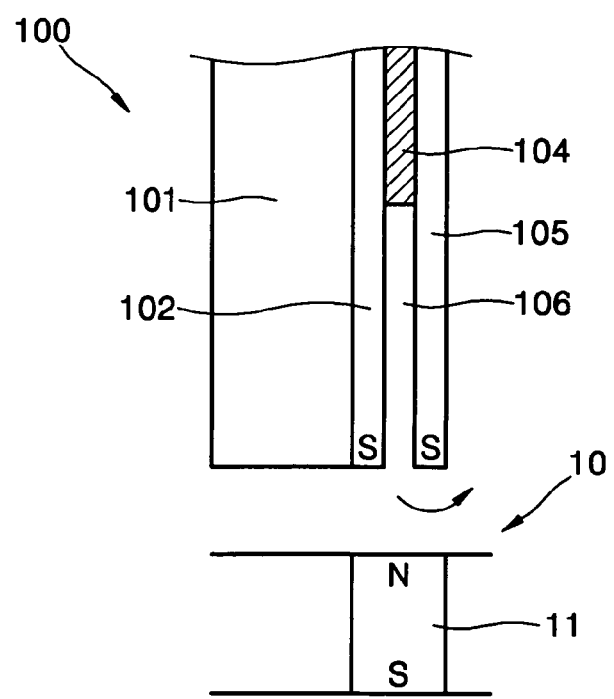

FIGS. 1 and 2 are schematic views illustrating a MR sensor 100 according to a first embodiment of the present invention. The MR sensor 100 includes a substrate 101, a first magnetic layer 102 formed on the substrate 101, an insulating layer 104 partially formed on the first magnetic layer 102, and a second magnetic layer 105, wherein the second magnetic layer 105 has a first portion contacting the upper surface of the insulating layer 104 and a second portion extending beyond the insulating layer 104 and bent towards a part of the first magnetic layer 102. That is, the second portion of the second magnetic layer 105 is structured such that the second portion is movable, and therefore can contact or be spaced apart from the first magnetic layer 102.

The first and second magnetic layers 102 and 105 are mainly composed of soft magnetic material, and may be in the form of a monolayered or multi-layered thin film. That is, the first and second magnetic layers 102 and 105 can be formed as soft magnetic material thin films by means of sputtering, vapor deposition or electroplating etc. The thickness of the thin films is not limited, but in order that the second portion of the second magnetic layer 105 quickly responds to a small magnetic force, the second magnetic layer 105 can be made thinner than the first magnetic layer 102. In addition, the end of the magnetic layer close to a magnetic recording medium may be sharpened to concentrate the magnetic field from the magnetic recording medium on the sharpened tip portion.

When the first and second magnetic layers 102 and 105 are both composed of soft magnetic material, as illustrated in FIG. 1, the second magnetic layer 105 is bent towards the first magnetic layer 102 to mechanically contact the first magnetic layer 102 in the absence of an external magnetic field, which is the initial state of the MR sensor. Such mechanical contact is caused by a spring property in the second magnetic layer 105, and it is desirable to maintain the contact state even when some kinds of vibration or mechanical perturbation are applied to the sensor.

Such a spring property may be realized in various manners such as, for example, applying a mechanical stress thereto through a coat of material with a different thermal coefficient disposed onto one side of the second magnetic layer 105, or implanting ions into one side of the second magnetic layer 105, thereby bending it.

Like a conventional MR sensor, the MR sensors according to the present embodiments of the invention have a resistance detection unit, which is connected with the first and second magnetic layers to detect resistance value. A resistance detection unit 301 with the sensor according to the first embodiment is connected with the first magnetic layer 102 as a first magnetic element and the second magnetic layer 105 as a second magnetic element. The sensors of the other embodiments described below also have a resistance detection unit (although not shown in the drawings) connected to the corresponding first and second magnetic elements in those other embodiments.

An operation of the MR sensor according to the first embodiment of the present invention will now be described as follows. FIG. 2 illustrates a state where the north pole of a magnetic information area 11 of a magnetic recording medium 10 approaches one side of the sensor 100 of the first embodiment. When the magnetic field of the magnetic information area 11 is applied to the sensor 100, the magnetic field is equally applied to the first and second magnetic layers 102 and 105. Thus, the first and second magnetic layers 102 and 105 are repelled from each other so that the second magnetic layer 105 is resiliently deformed in a direction away from the first magnetic layer 102, thereby separating the first and second magnetic layers from each other.

Since the electrical resistance between the two magnetic layers when contacting each other and when separated from each other is approximately close to 0 and infinity, respectively, the sensor 100 of the present embodiment may generate a discontinuous signal.

Figure 3:
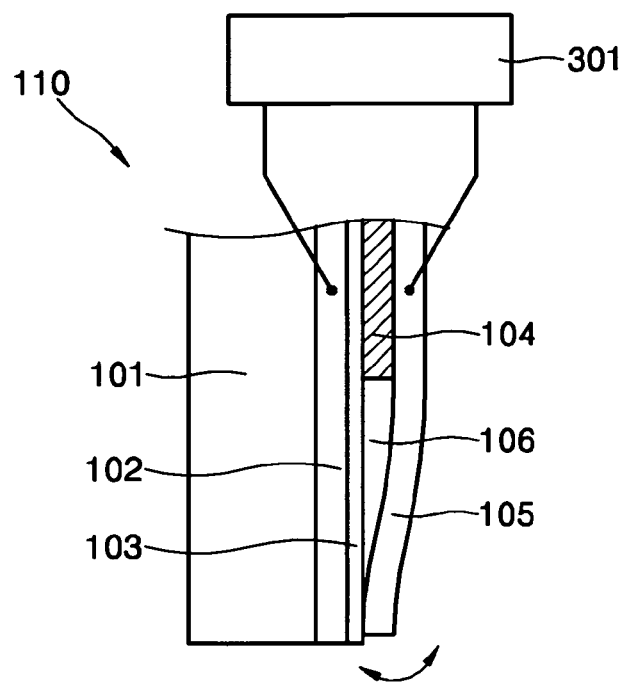
FIG. 3 is a schematic view illustrating a MR sensor according to a second embodiment of the present invention.

FIG. 3 is a schematic view illustrating a MR sensor 110 according to a second embodiment of the present invention. The sensor 110 may further include an insulating film on at least one of the opposing surfaces of the first and second magnetic layers 102 and 105. The sensor 110 of the second embodiment has an insulating film 103 disposed on the upper surface of the first magnetic layer 102 opposite the second magnetic layer 105. The insulating layer 104 and the insulating film 103 are both composed of electrically insulating material. The insulating film 103 implements a tunneling barrier function between the first and second magnetic layers 102 and 105, and preferably is relatively thin. As for such insulating material, an insulating oxide such as aluminum oxide, magnesium oxide etc. can be used, or nitrides, fluorides etc. can be used.

If an external magnetic field is not applied to the MR sensor 110, the first and second magnetic layers 102 and 105 are magnetized in opposite directions from each other and are attracted to each other so that the second magnetic layer 105 thus contacts the insulating film 103 on the first magnetic layer 102, as shown in FIG. 3. At this time, the first and second magnetic layers 102 and 105 form a tunneling structure, and the resistance detection unit 301 detects a tunneling resistance value. When a magnetic field is applied to the sensor 110, similar to the sensor 100 of the first embodiment, the first and second magnetic layers are repelled from each other, so that a resistance value is detected that is larger than the tunneling resistance value by at least several times through tens of times.

Figure 4:
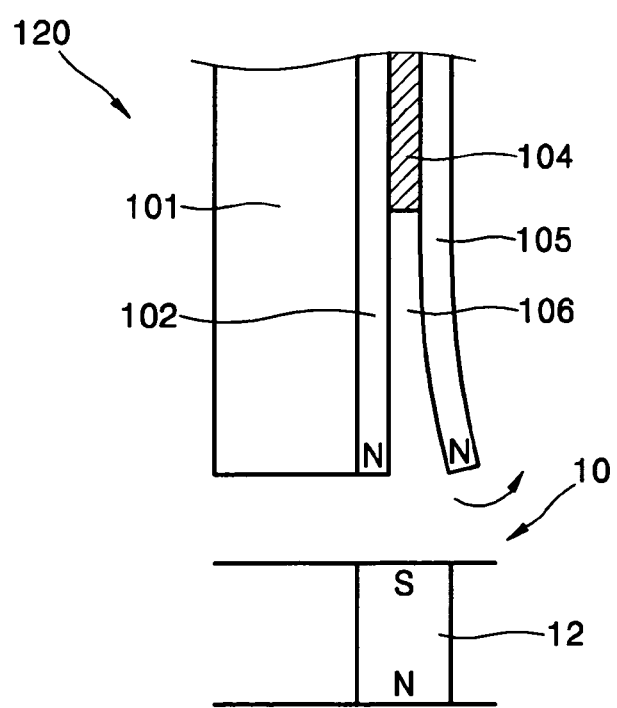
FIGS. 4 and 5 are schematic views illustrating a MR sensor according to a third embodiment of the present invention.
Figure 5:
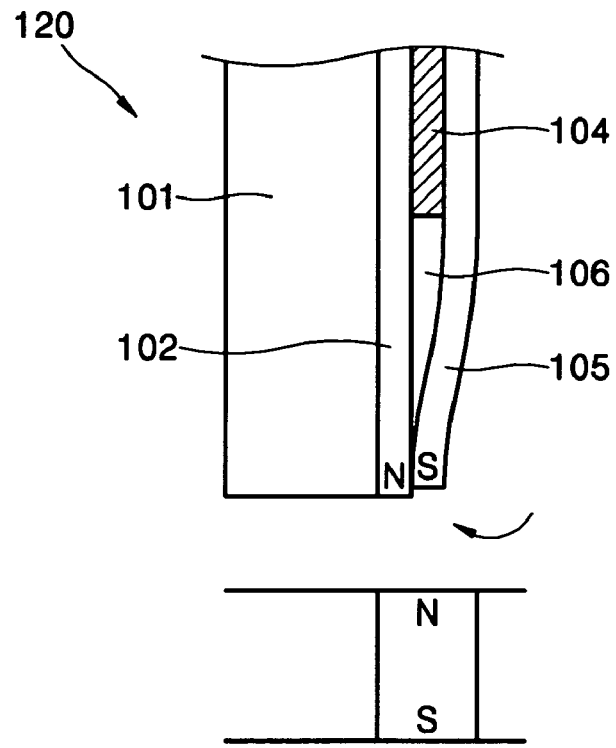

FIGS. 4 and 5 are schematic views illustrating a MR sensor 120 according to a third embodiment of the present invention. The sensor 120 of this embodiment is substantially identical to the sensor 100 of the first embodiment in its structure, but different therefrom in its material. According to this embodiment, the first magnetic layer 102 is composed of hard magnetic material, and the second magnetic layer 105 is generally composed of soft magnetic material. As described before, semi-hard magnetic material can also be used instead of using the soft magnetic material.

As illustrated in FIG. 4, when the south pole of a magnetic information area 12 approaches the sensor 120 according to the third embodiment of the present invention, the magnetic field of the magnetic information area 12 is applied to the second magnetic layer 105 due to a property of material. So a repulsive force is generated between the first magnetic layer 102 maintaining its magnetization as hard magnetic material and the second magnetic layer 105 so that the second magnetic layer 105 is deformed in a direction away from the first magnetic layer 102. On the contrary, as illustrated in FIG. 5, when the north pole of the magnetic information area 12 approaches the sensor 120, the first magnetic layer 102 maintains its magnetization as the hard magnetic material, and the magnetic field of the magnetic information area 12 is applied to the second magnetic layer 105, exerting an attractive force between the two magnetic layers to mechanically contact each other. In this case, a considerably low resistance value is realized upon contact in comparison with the tunneling structure as illustrated in FIG. 3, which is advantageous in realizing a high magnetoresistance ratio.

Figure 6:
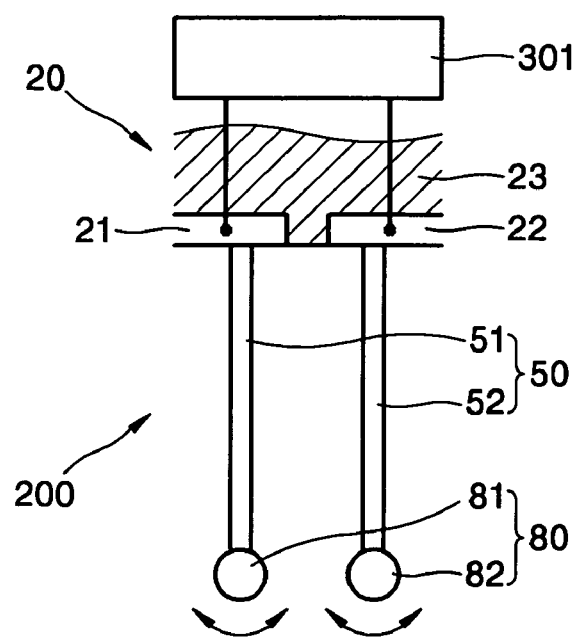
FIGS. 6 through 8 are schematic views illustrating a MR sensor according to a fourth embodiment of the present invention.
Figure 7:
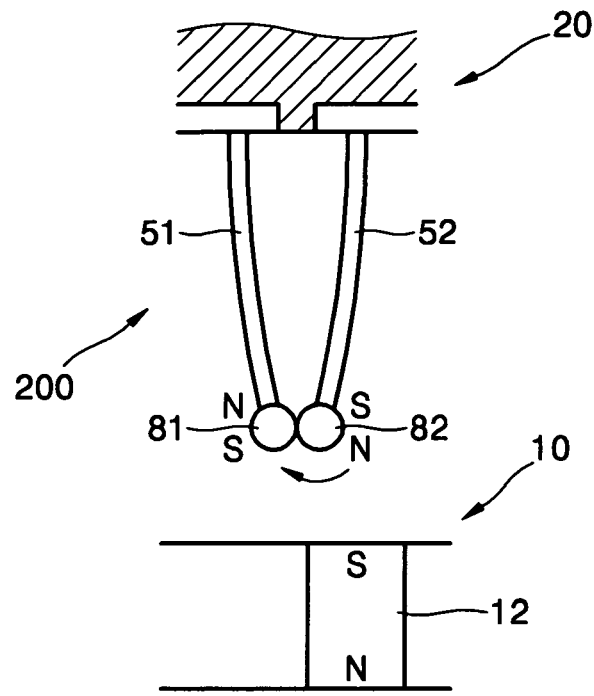
Figure 8:
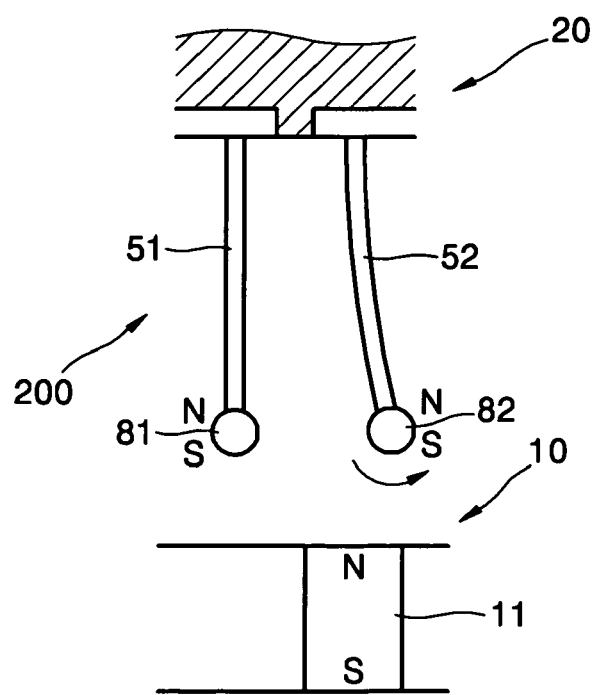

FIGS. 6 through 8 are schematic views illustrating a MR sensor 200 according to a fourth embodiment of the present invention. The sensor 200 includes a substrate 20 and a pair of carbon nano tube resilient members 50, i.e., first and second carbon nano tube resilient members 51 and 52. Each of the pair of carbon nano tube resilient members 50 has at its free end a magnetic member 80. Herein, preferably, a first magnetic member 81 of the first carbon nano tube resilient member 51 is composed of hard magnetic material, and a second magnetic member 82 of the second carbon nano tube resilient member 52 is composed of soft magnetic material.

Fixed ends of the first and second carbon nano tube resilient members 51 and 52 are preferably fixed to first and second electrodes 21 and 22 of the substrate 20, and the first and second electrodes 21 and 22 are preferably electrically insulated from each other by an insulator 23. The first and second electrodes 21 and 22 are connected to both ends of the resistance detection unit 301, respectively. The sensor 200 which is fixed at one end to the substrate 20 can be disposed adjacent to a recording medium 10 to the extent that the magnetic member 80 is affected by the magnetic field applied by the information area of the recording medium.

The sensor 200 according to this embodiment may be reduced in size to less than 100 nanometer scale. For example, in order to deal with the size (about 12 nm in diameter) of the information area of the recording medium with area 1 recording density of about 1 Th/in$^2$, the pair of carbon nano tube resilient members 50 may have a distance therebetween of about 5 to 10 nm.

An operating principle of the sensor 200 according to this embodiment will now be described as follows. Although the orientation of the first magnetic member 81 can be fixed upward or downward, we assumed it directing upward here. As illustrated in FIG. 7, if the south pole of the magnetic information area 12 arrives at a position corresponding to the second magnetic member 82, the magnetic field of the magnetic information area 12 is applied to the second magnetic member 82. At this time, the first and second magnetic members 81 and 82 are oppositely oriented so that an attractive force is generated therebetween. Due to the attractive force therebetween, the first and second carbon nano tube resilient members 51 and 52 are reversibly bent towards each other so that the first magnetic member 81 contacts the second magnetic member 82.

On the contrary, as illustrated in FIG. 8, if the north pole of the magnetic information area 11 of the recording medium 10 arrives at a position corresponding to the second magnetic member 82, the magnetic field of the magnetic information area 11 is applied to the second magnetic member 82. At this time, the first and second magnetic members 81 and 82 are oriented in the same direction, so that a repulsive force is generated therebetween. Due to the repulsive force therebetween, the first and second carbon nano tube resilient members 51 and 52 are reversibly bent in a direction away from each other.

The resistance value between the first and second electrodes 21 and 22 that had been approximately close to infinity is decreased discontinuously to a value close to 0 due to the contact. The sensor 200 according to this embodiment thus can generate a discrete signal corresponding to digital information recorded on the recording medium 10.

The magnetic member 80 can be in the form of a nano structure such as a nano particle, nano wire or nano sheet etc. in which at least one dimension has a size of less than 100 nanometers. It is sufficient that the magnetic member has a structure capable of being provided in a state of being fixed to a terminal end of the carbon nano tube resilient member.

The MR sensors according to various embodiments of the present invention can be used in a magnetic information storage device such as a hard disk drive (HDD) etc. due to the above mentioned features and advantages. The magnetic information storage device includes a magnetic recording medium, a magnetic recording head magnetizing a certain area of the magnetic recording medium and recording information thereto, and a magnetic reading head detecting and reproducing magnetic information stored in the information area. The MR sensor according to the present invention can be used as the magnetic reading head. In particular, the sensor may be very useful for storing digital information in the magnetic information storage device.

From the construction of the present invention, the digital MR sensor according to the present invention has a discontinuous change in resistance of the order of thousands of percent or more depending on the existence of the external magnetic field or on the pole orientation. In addition, it is possible to accurately reproduce highly integrated magnetic information.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A digital magneto-resistive (MR) sensor, comprising:
a first magnetic element; and
a second magnetic element at least a part of which is resiliently deformable so as to contact with or be separated from the first magnetic element according to a direction of a magnetic force generated between the first and second magnetic elements while the second magnetic element is magnetized under influence of an external magnetic field.

2. The digital MR sensor according to claim 1, wherein each of the first and second magnetic elements has at least a portion thereof composed of one of soft magnetic material and semi-hard magnetic material.

3. The digital MR sensor according to claim 1, wherein the first magnetic element has at least a portion thereof composed of a hard magnetic material, and the second magnetic element has at least a portion thereof composed of one of a soft magnetic material and a semi-hard magnetic material.

4. The digital MR sensor according to claim 1, wherein the second magnetic element is integrally formed with a resiliently deformable soft magnetic material.

5. The digital MR sensor according to claim 1, wherein the second magnetic element has a magnetic member and a resilient member having first and second ends, wherein the resilient member is fixed at the first end to the substrate and connected at the second end to the magnetic member so that the resilient member changes a position of the magnetic member through the resilient deformation of the resilient member.

6. The digital MR sensor according to claim 5, wherein the first magnetic element has a hard magnetic member and a resilient member having first and second ends, wherein the resilient member is fixed at the first end to the substrate and connected at the second end to the hard magnetic member so that the resilient member changes a position of the magnetic member through the resilient deformation of the resilient member.

7. The digital MR sensor according to claim 1, wherein a thickness of the second magnetic element is thinner than a thickness of the first magnetic element.

8. The digital MR sensor according to claim 1, wherein the second magnetic element has an end disposed close to a recording medium and the end has a sharpened tip.

9. A digital magneto-resistive (MR) sensor, comprising:
a first magnetic layer formed on a substrate;
an insulating layer partially formed on the first magnetic layer; and
a second magnetic layer having a first portion contacting an upper surface of the insulating layer and a second portion extending out of the insulating layer so that the second portion faces a part of the first magnetic layer,
wherein the second portion of the second magnetic layer is resiliently deformable so as to contact with or be separated from the first magnetic layer according to a direction of a magnetic force generated between the first and second magnetic layers while the second magnetic layer is magnetized under an influence of an external magnetic field.

10. The digital MR sensor according to claim 9, wherein each of the first and second magnetic layers has at least a part thereof composed of one of soft magnetic material and semi-hard magnetic material.

11. The digital MR sensor according to claim 9, wherein the first magnetic layer is composed of hard magnetic material and the second magnetic layer is composed of one of soft magnetic material and semi-hard magnetic material.

12. The digital MR sensor according to claim 9, further comprising an insulating film disposed on at least one side of opposing surfaces of the first and second magnetic layers.

13. The digital MR sensor according to claim 12, wherein the insulating film is one of aluminum oxide, magnesium oxide, a nitride or a fluoride.

14. A digital magneto-resistive (MR) sensor comprising:
a first carbon nano tube resilient member having a free end and a fixed end fixed to a substrate;
a first magnetic member provided at the free end of the first carbon nano tube resilient member;
a second carbon nano tube resilient member having a free end and a fixed end fixed to the substrate, the second carbon nano tube resilient member provided adjacent to the first carbon nano tube resilient member; and
a second magnetic member provided at the free end of the second carbon nano tube resilient member which is resiliently deformable so as to contact with or be separated from the first magnetic member according to a direction of a magnetic force generated between the first and second magnetic members while the second magnetic member is magnetized under an influence of an external magnetic field.

15. The digital MR sensor according to claim 14, wherein the first magnetic member is composed of hard magnetic material and the second magnetic member is composed of one of soft magnetic material and semi-hard magnetic material.

16. The digital MR sensor according to claim 14, wherein the substrate has first and second electrodes insulated from each other, and the fixed ends of the first and second carbon nano tube resilient members are connected to the first and second electrodes, respectively.

17. The digital MR sensor according to claim 14, wherein the first magnetic member is one of a nano particle, a nano wire and a nano sheet having a hard magnetic property.

18. The digital MR sensor according to claim 14, wherein the second magnetic member is one of a nano particle, a nano wire and a nano sheet having a soft or semi-hard magnetic property.

19. The digital MR sensor according to claim 14, wherein the first and second carbon nano tube resilient members are linearly shaped and resiliently bendable.

20. A magnetic reading head for detecting magnetic information recorded onto an information area of a magnetic recording medium and generating a reproducing signal, the magnetic reading head comprising:
a first magnetic layer formed on a substrate;
an insulating layer partially formed on the first magnetic layer;
a second magnetic layer having a first portion contacting an upper surface of the insulating layer and a second portion extending out of the insulating layer and facing a part of the first magnetic layer; and
a resistance detection unit connected to the first and second magnetic layers, respectively, so as to detect a resistance value between the first and second magnetic layers,
wherein the second portion of the second magnetic layer is resiliently deformable so as to contact with or be separated from the first magnetic layer according to a direction of a magnetic force generated between the first and second magnetic layers while the second magnetic layer is magnetized under an influence of an external magnetic field.

21. The magnetic reading head according to claim 20, wherein the external magnetic field is generated by the information area of the magnetic recording medium.

22. A magnetic reading head for detecting magnetic information recorded onto an information area of a magnetic recording medium and generating a reproducing signal, the magnetic reading head comprising:
a first carbon nano tube resilient member having a free end and a fixed end fixed to a substrate;
a first magnetic member provided at the free end of the first carbon nano tube resilient member;
a second carbon nano tube resilient member having a free end and a fixed end fixed to the substrate and provided adjacent to the first carbon nano tube resilient member;
a second magnetic member provided at the free end of the second carbon nano tube resilient member which is resiliently deformable, so as to contact with or be separated from the first magnetic member according to a direction of a magnetic force generated between the first and second magnetic members while the second mag netic member is magnetized under an influence of an external magnetic field; and a resistance detection unit connected to the fixed ends of the first and second carbon nano tube resilient members so as to detect a resistance value between the fixed ends.

23. The magnetic reading head according to claim 22, wherein the external magnetic field is generated by the information area of the magnetic recording medium.

* * * * *